(12) United States Patent
Lewis

(10) Patent No.: US 8,487,739 B2
(45) Date of Patent: Jul. 16, 2013

(54) TELEVISION THEFT DETERRENCE

(75) Inventor: Richard Lewis, Buffalo Grove, IL (US)

(73) Assignee: Zenith Electronics LLC, Lincolnshire (IL)

( * ) Notice: Subject to any disclaimer, the term of this patent is extended or adjusted under 35 U.S.C. 154(b) by 947 days.

(21) Appl. No.: 12/341,066

(22) Filed: Dec. 22, 2008

(65) Prior Publication Data

US 2010/0156592 A1  Jun. 24, 2010

(51) Int. Cl.
| | | |
|---|---|---|
| *G05B 19/00* | (2006.01) |
| *G05B 23/00* | (2006.01) |
| *G06F 7/00* | (2006.01) |
| *G06F 7/04* | (2006.01) |
| *G06K 19/00* | (2006.01) |
| *G08B 29/00* | (2006.01) |
| *G08C 19/00* | (2006.01) |
| *H04B 1/00* | (2006.01) |
| *H04B 3/00* | (2006.01) |
| *H04L 9/14* | (2006.01) |
| *H04L 9/32* | (2006.01) |
| *H04Q 1/00* | (2006.01) |

(52) U.S. Cl.
USPC ...... 340/5.2; 340/571; 340/568.1; 340/568.2; 340/568.3; 340/870.09; 340/5.64

(58) Field of Classification Search
USPC ............. 340/5.2, 571, 568.1, 568.2, 568.3, 340/5.64, 870.09
See application file for complete search history.

(56) References Cited

U.S. PATENT DOCUMENTS

| | | | | |
|---|---|---|---|---|
| 3,696,378 | A * | 10/1972 | Daniel | 340/568.2 |
| 4,121,201 | A * | 10/1978 | Weathers | 340/524 |
| 4,149,144 | A * | 4/1979 | Diefenderfer | 370/255 |
| 4,284,983 | A * | 8/1981 | Lent | 340/522 |
| 4,667,193 | A * | 5/1987 | Cotie et al. | 340/10.32 |
| 4,689,619 | A * | 8/1987 | O'Brien, Jr. | 340/10.2 |
| 5,025,486 | A * | 6/1991 | Klughart | 340/3.1 |
| 5,034,723 | A * | 7/1991 | Maman | 340/568.2 |
| 5,406,261 | A * | 4/1995 | Glenn | 340/571 |
| 5,446,918 | A * | 8/1995 | Lamy | 725/114 |
| 5,525,965 | A * | 6/1996 | Liebenthal | 340/568.3 |
| 5,539,882 | A * | 7/1996 | Gopal et al. | 709/220 |
| 5,572,517 | A * | 11/1996 | Safadi | 370/431 |
| 5,748,083 | A * | 5/1998 | Rietkerk | 340/568.2 |
| 5,936,526 | A * | 8/1999 | Klein | 340/571 |
| 6,067,018 | A * | 5/2000 | Skelton et al. | 340/573.3 |
| 6,067,440 | A * | 5/2000 | Diefes | 725/27 |
| 6,087,937 | A * | 7/2000 | McCarthy | 340/567 |
| 6,111,504 | A * | 8/2000 | Packard et al. | 340/568.1 |
| 6,166,688 | A * | 12/2000 | Cromer et al. | 342/357.74 |
| 6,310,550 | B1 * | 10/2001 | Wagener | 340/568.1 |
| 6,518,874 | B2 * | 2/2003 | Barrus et al. | 340/5.64 |
| 6,639,513 | B2 * | 10/2003 | Olsen et al. | 340/568.1 |
| 6,956,480 | B2 * | 10/2005 | Jespersen | 340/568.1 |
| 7,024,548 | B1 * | 4/2006 | O'Toole, Jr. | 713/1 |
| 7,190,264 | B2 * | 3/2007 | Brown et al. | 340/539.23 |
| 7,201,029 | B2 * | 4/2007 | Murray et al. | 70/58 |
| 7,378,964 | B1 * | 5/2008 | Amir et al. | 340/539.32 |

(Continued)

*Primary Examiner* — Benjamin C Lee
*Assistant Examiner* — Quang D Pham
(74) *Attorney, Agent, or Firm* — Schiff Hardin LLP

(57) ABSTRACT

A signal received by a television over a communication medium is interrogated for the presence of a remotely transmitted ping. The television is operated in response to detection of the presence of the ping in the received signal. The television is locked against use in response to failing to detect the presence of the ping in the received signal.

17 Claims, 2 Drawing Sheets

U.S. PATENT DOCUMENTS

| | | | |
|---|---|---|---|
| 7,701,339 B2 * | 4/2010 | Irmscher et al. | 340/568.1 |
| 7,895,632 B2 * | 2/2011 | Sadja et al. | 725/107 |
| 8,046,798 B1 * | 10/2011 | Schlack et al. | 725/46 |
| 2001/0019559 A1 * | 9/2001 | Handler et al. | 370/468 |
| 2002/0092015 A1 * | 7/2002 | Sprunk et al. | 725/9 |
| 2002/0104083 A1 * | 8/2002 | Hendricks et al. | 725/34 |
| 2002/0109601 A1 * | 8/2002 | Arens | 340/573.1 |
| 2002/0116638 A1 * | 8/2002 | Dobes et al. | 713/201 |
| 2003/0204749 A1 * | 10/2003 | Pugh et al. | 713/201 |
| 2005/0114879 A1 * | 5/2005 | Kamieniecki | 725/15 |
| 2008/0112704 A1 * | 5/2008 | Needle et al. | 398/71 |
| 2008/0191872 A1 * | 8/2008 | Cardona et al. | 340/568.1 |
| 2009/0167525 A1 * | 7/2009 | Gilboy | 340/539.32 |
| 2009/0201125 A1 * | 8/2009 | Ikeguchi et al. | 340/5.2 |
| 2009/0201126 A1 * | 8/2009 | Ikeguchi | 340/5.2 |

* cited by examiner

TELEVISION THEFT DETERRENCE

TECHNICAL FIELD

The technical field of the present disclosure relates to the detection of television theft.

BACKGROUND

Televisions are frequently used in facilities to which the public has ready access. For example, televisions are provided in hotels and motels so that their guests may enjoy entertainment and may receive information about services offered by the hotels and motels. The theft of televisions from such facilities has not historically been a significant problem due in large part to the weight of the televisions. However, with the advent of flat screen televisions, the weight of televisions has, been materially reduced. As a result, theft of televisions has been on the increase.

Accordingly, deterrence of television theft is needed.

BRIEF DESCRIPTION OF THE DRAWINGS

Features and advantages of a television theft deterrence arrangement will become more apparent from a detailed consideration of the drawings in which.

DETAILED DESCRIPTION

Figure 1:
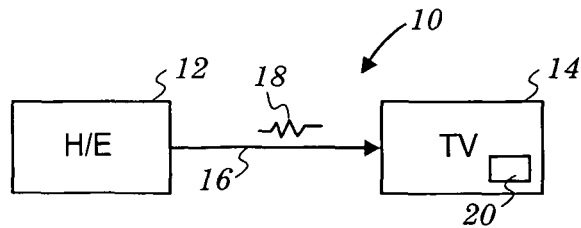
FIG. 1 illustrates one embodiment of a television equipped to deter theft.

As shown in FIG. 1, a system 10 includes a head end 12 and a television 14 coupled to one another by a communication medium 16. As explained below, the television 14 is equipped to deter its theft.

The head end 12, for example, may be a server located in a facility in which the television 14 is also located. Alternatively, the head end 12 may be a receiver, a server, and/or other processing equipment that is located in the facility and that receives a satellite feed to supply television programs and other content to the television 14. Other alternatives are possible.

The communication medium 16 may be a cable that couples the head end 12 to the television 14. Alternatively, the communication medium 16 may be a wireless channel that couples the head end 12 to the television 14. Other alternatives are possible.

The head end 12 intermittently transmits a ping 18 over the communication medium 16 to the television 14. For example, the ping 18 may be transmitted periodically such as daily, hourly, or otherwise. Alternatively, the ping 18 may be transmitted aperiodically so as make its unauthorized replication more difficult.

The television 14 includes a ping detector 20 that is arranged so that, if it does not receive the ping 18 as expected, the ping detector 20 locks the television 14 so as to prevent any further use of the television 14. For example, the ping detector 20 can be arranged to lock the television 14 off to prevent users from turning the television 14 on. Alternatively, the ping detector 20 may be arranged to display a screen on the television 14 to inform the user that the user is not authorized to operate the television 14 and to otherwise prevent the television 14 from displaying video and/or audio. In order to avoid locking of the television 14 when the ping 18 is not transmitted by the head end 12 or received by the television 14 due to events, such as power interruptions, that are not related to theft, the ping detector 20 may be arranged; to lock the television 14 only when a predetermined number (such as three) of consecutive pings 18 are not received and detected.

The ping 18 may be an in-band ping or an out-of-band ping. In the case of an out-of-band ping, the ping 18, for example, may be a signal including a predetermined frequency or mixture of frequencies and/or having a predetermined duration that is detectible by the ping detector 20. If an out-of-band signal is used, a tuner other than the television's tuner may be required to tune to the out-of-band out of back signal. If an in-band ping is used, the television's tuner can be used to tune the in-band signal.

Figure 2:
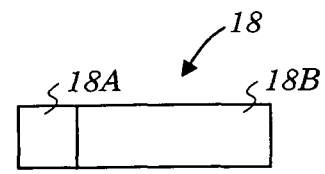
FIG. 2 illustrates one embodiment of a ping that can be used in connection with the television of FIG. 1.

In the case of either an out-of-band ping or an in-band ping, the ping 18, for example, may have the construction shown in FIG. 2. As shown in FIG. 2, the ping 18 is a private data packet having a packet identification (PID) portion 18A and a code portion 18B. The PID portion 18A allows the ping detector 20 to identify the ping 18 as a ping. The code portion 18B may include a code comprising meaningful characters and may be used for any purpose. For example, the code in the code portion 18B may be used to identify a particular facility. Thus, if the television 14 is moved to an unauthorized facility that happens to have a pinging system, the ping detector 20 will not recognize the code in the pings transmitted by the unauthorized facility and will lock the television 14.

The code portion 18B of the ping 18 may be programmable by the head end 12. Thus, by configuring the television 14 to appropriately respond to the differently programmed code portions 18B increased operational multiple tiers of service, such as the display of different screens on the television 14, disabling of different functions of the television 14, and/or permitting access only to a menu of location service offerings, as determined by the particular code in the code portion 18E. Additionally or alternatively, authorization for programs could be provided during periods of time set by the code in the code portion 18B. Still additionally or alternatively, codes in the code portion 18B could be used to designate corresponding locations in which the system 10 is used. Other uses for the code in the code portion 18B are possible.

The code portion 18B of the ping 18 may also be provided with security. This security could be used to protect against using the code in the code portion 18B to effect unauthorized changes to the tiered services or false authorizations to programs. Security can be provided, for example, by encrypting or scrambling the code in the code portion 18B based on an initialization parameter such as the location number.

In one embodiment, the ping detector 20 is firmware or a hardwired circuit that provides the functions as described above. In another embodiment, the ping detector 20 is software that provides the functions as described above. In this latter embodiment, the ping detector 20, for example, may include a processor that executes the software, which is stored in a memory to which the processor is coupled.

Figure 3:
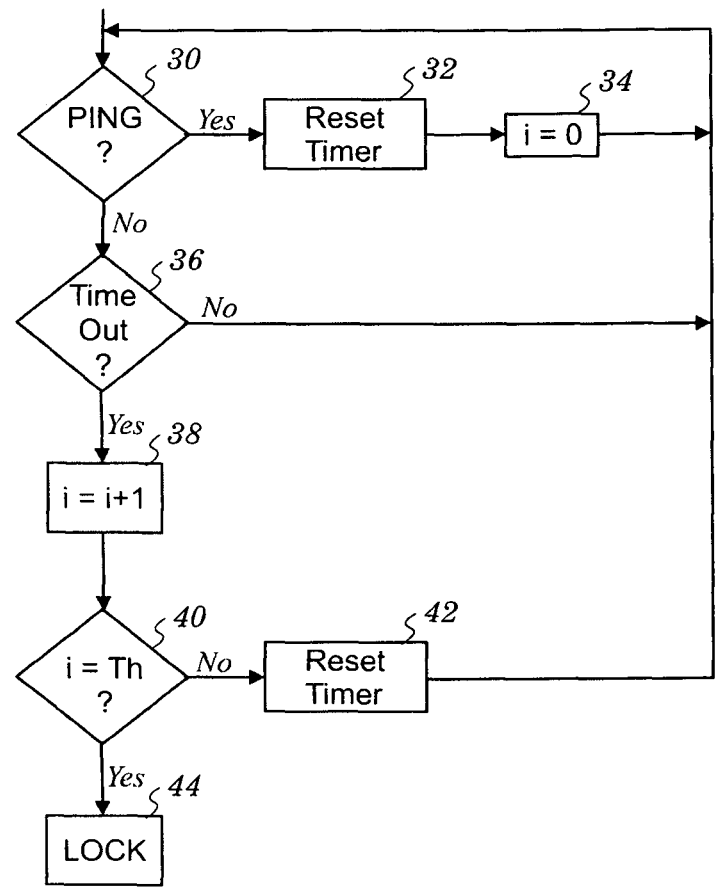
FIG. 3 is a flow chart representing operations of a ping detector of the television of FIG. 1.

The detection process, either implemented as software or by a circuit or firmware, may be represented by the flow chart of FIG. 3. As shown in FIG. 3, the ping detector 20 determines at 30 whether it has detected the ping 18. If the ping detector 20 detects the ping 18, the ping detector 20 resets a ping timer at 32. This ping timer keeps track of the amount of elapsed time since the ping detector 20 detected the last ping. The determination at 30 is made on an intermittent basis and should preferably be made more than once during the time out period of the ping timer. After the ping timer is reset at 32, a ping failure count variable i is reset such as to zero at 34 and flow returns to 30 to await the next determination.

If the ping detector 20 does not detect the ping 18 at 30, the ping detector 20 at 36 determines whether the ping timer has timed out. If not, flow returns to 30 to await the next determination. If the ping detector 20 at 36 determines that the ping timer has timed out, the ping failure count variable i is incremented by one at 38 and the ping detector 20 at 40 determines whether the ping failure count variable i has reached a count threshold Th.

If the ping detector 20 at 40 determines that the ping failure count variable i has not reached the count threshold Th, the ping detector 20 resets the ping timer at 42 and flow returns to 30 to await the next determination. However, if the ping detector 20 at 40 determines that the ping count failure variable i has reached the count threshold Th, the ping detector 20 at 44 locks the television 14 in any manner such as those discussed above.

In this manner, a predetermined number of consecutive pings must be missed before the television 14 is locked. However, if it is desired to lock the television 14 when just one ping is missed, then either the count threshold Th can be set to one or blocks 32, 34, 38, 40, and 42 can be bypassed or eliminated.

Figure 4:
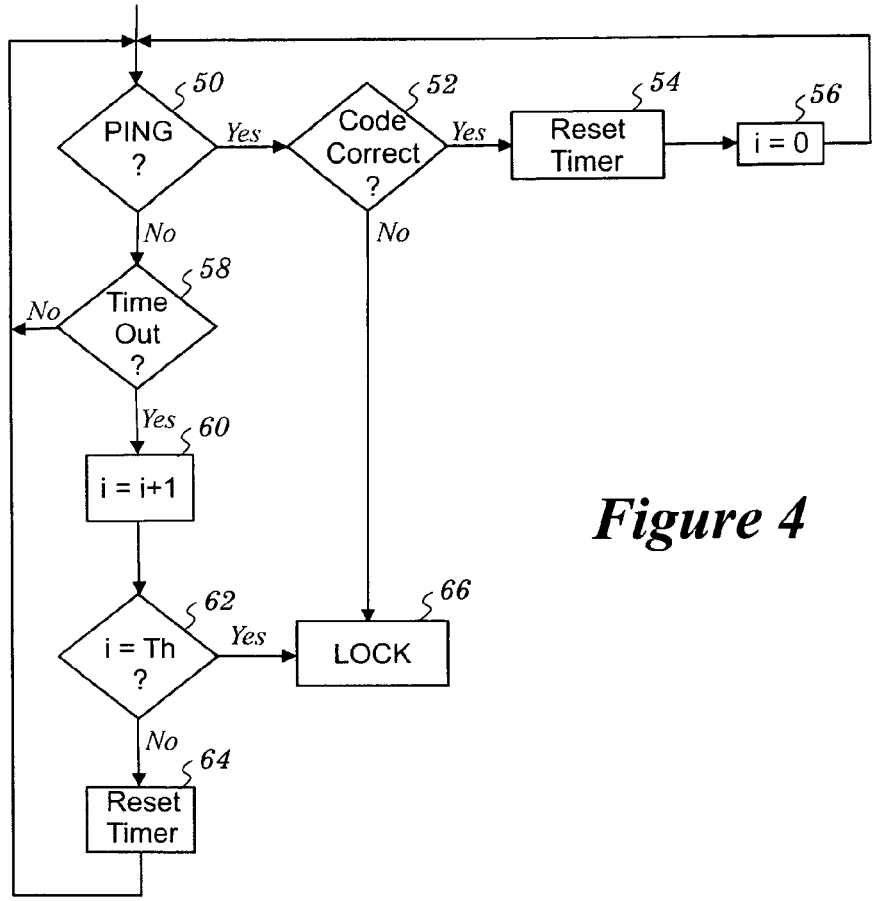
FIG. 4 is a flow chart representing; alternative operations of a ping detector of the television of FIG. 1; and, FIG. 5 illustrates another embodiment of a television equipped to deter theft.

In the case where the ping 18 includes the code portion 18B, the detection process may be represented by the flow chart of FIG. 4. As shown in FIG. 4, the ping detector 20 determines at 50 whether it has detected the ping 18 (such as by use of the PID). If the ping detector 20 detects the ping 18, the ping detector 20 determines at 52 whether the code in the code portion 18B of the ping 18 is correct, e.g., matches a code stored in the ping detector 20. If the ping detector 20 determines at 52 that the code in the code portion 18B of the ping 18 is correct, the pine detector at 54 resets a ping timer. As before, this ping timer keeps track of the amount of elapsed time since detection of the last ping. The determination at 50 is made on an intermittent basis and should preferably be made more than once during the time out period of the ping timer. After the ping timer is reset at 54, a ping failure count variable i is reset such as to zero at 36 and flow returns to 50 to await the next determination.

If the ping detector 20 does not detect the ping 18 at 50, the ping detector 20 at 58 determines whether the ping timer has timed out. If not, flow returns to 50 to await the next determination. If the ping detector 20 at 58 determines that the ping timer has timed out, the ping detector 20 at 60 increments the ping failure count variable i by one. The ping detector 20 at 62 determines whether the ping failure count variable i has reached a count threshold Th.

If the ping detector 20 at 62 determines that the ping failure count variable i has not reached the count threshold Th, the ping detector 20 resets the ping timer at 64 and flow returns to 50 to await the next determination. However, if the ping detector 20 at 62 determines that the ping failure count variable i has reached the count threshold Th, or if the ping detector determines at 52 that the code in the code portion 18B of the ping 18 is not correct, the ping detector 20 at 66 locks the television 14 in any manner such as those as discussed above.

Figure 5:
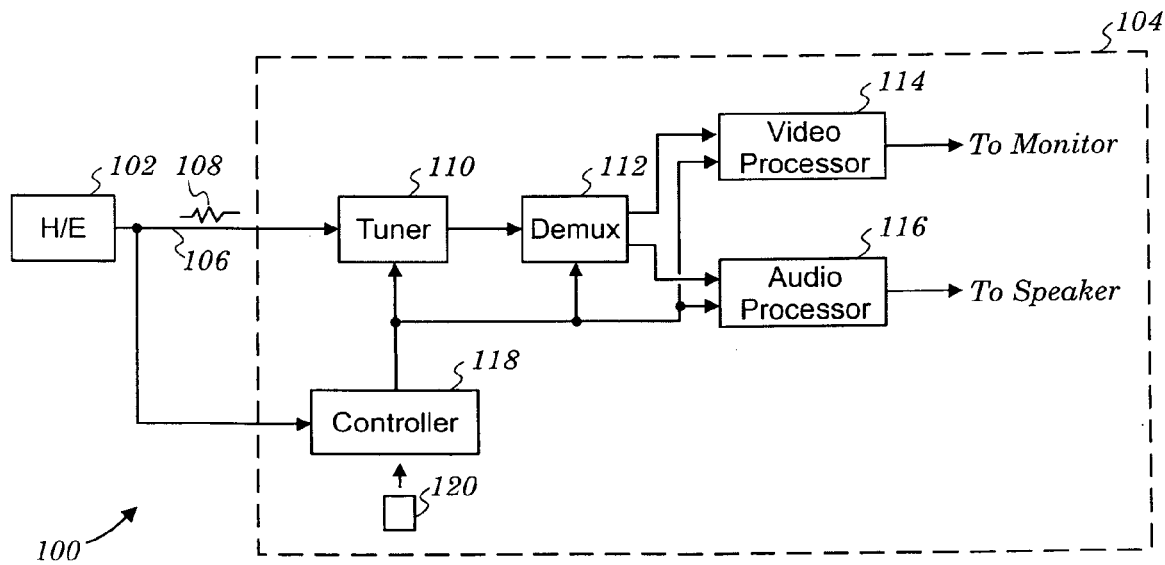

As shown in FIG. 5, a system 100 includes a head end 102 and a television 104 coupled to one another by a communication medium 106. As explained below, the television 104 is equipped to deter its theft.

The head end 102, for example, may be a server located in a facility in which the television 104 is also located. Alternatively, the head end 102 may be a receiver, a server, and/or other processing equipment that is located in the facility and that receives a satellite feed to supply television programs and other content to the television 104. Other alternatives are possible.

The communication medium 106 may be a cable that couples the head end 102 to the television 104. Alternatively, the communication medium 106 may be a wireless channel that couples the head end 102 to the television 104. Other alternatives are possible.

The head end 102 transmits a ping 108 over the communication medium 106 to the television 104. For example, the ping 108 may be transmitted periodically such as daily, hourly, or otherwise. Alternatively, the ping 108 may be transmitted aperiodically according to predetermined pattern so as make its unauthorized replication more difficult.

The television 104 includes a tuner 110 that provides a tuned output to a demultiplexer 112. The demultiplexer 112 routs video in the tuned output from the tuner 110 to a video processor 114, and the demultiplexer 112 routs audio in the tuned output from the tuner 110 to an audio processor 116. The video processor 114 supplies video to a television display, and the audio processor 116 supplies audio to one or more speakers.

A television controller 118 controls the tuner 110, the demultiplexer 112, the video processor 114, and the audio processor 116 in order to display selected programs and/or information to the user. The user controls the television controller 118 by use of an input device 120. The input device 120, for example, is a remote control unit and/or a switch pad located on the chassis of the television 104.

The television controller 118 is programmed or arranged according to FIG. 3 or 4 to detect the ping 108 so that, if the television controller 118 does not detect the ping 18 as expected, the television controller 118 locks the television 104 so as to prevent any further use of the television 104. For example, the television controller 118 can be arranged to lock the television 104 off to prevent users from operating the television 104. For this purpose, the television controller 118 may be arranged to disabling the tuner 110 or the demultiplexer 112 or an on/off switch. Alternatively, the television controller 118 may be arranged to display a screen on the television 104 to inform the user that the user is not authorised to operate the television 104 and to otherwise prevent the television 104 from displaying video and/or audio. In order to avoid locking of the television 104 when the ping 108 is not transmitted by the head end 102 or received by the television 104 due to events such as power interruptions that are not related to theft, the television controller 118 may be arranged to lock the television 104 only when a predetermined number (such as three) of consecutive pings 108 are not received and detected.

The ping 108 may be an in-band ping or an out-of-band ping. In the case of an out-of-band ping, the ping 108, for example, may be a signal having a predetermined frequency or mixture of frequencies and a predetermined duration that is detectible by the television controller 118.

In the case of either an out-of-band ping or an in-band ping, the ping 108, for example, may have the construction shown in FIG. 2 and may be used by the television controller 118 in a similar manner as described above.

In one embodiment, the television controller 118 is firmware or a hard wired circuit that provides the functions as described above. In another embodiment, the television controller 118 is software that provides the functions as described above. In this latter embodiment, the television controller 118, for example, may be a processor that executes the software, which is stored in a memory to which the processor is coupled.

The software or the firmware of hard wired circuit may be represented by the flow chart of FIG. 3 or FIG. 4.

If desired, the facility within which the television is used may place a sign in the vicinity of the television to alert users that the television can be used only within the facility and that the television will not operate outside of the facility.

Certain modifications of the present invention have been discussed above. Other modifications of the present invention will occur to those practicing in the art of the present invention.

For example, as discussed above, the code portion 18B may be used for any purpose such as for identifying a particular facility. The code in the code portion 18B, however, may include a code comprising meaningless characters.

Also, the time out period tested at 36 and 58 may be constant or may be variable. In the latter case of a variable time out period, the time between pings may likewise be variable.

Additionally, as discussed above, the ping may be a signal either including a predetermined frequency or mixture of frequencies or an ID portion and a code portion. In the case of ping including an ID portion and a code portion, the code portion may contain a code linking the television to a facility. However, in the case of ping including a predetermined frequency or a mixture of frequencies, the predetermined frequency or a mixture of frequencies may be uniquely selected so as to link the television to a facility.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of locking a television against unauthorized use, comprising:
   operating the television to display television programming;
   interrogating a signal received by the television from a remotely located head end, the interrogating step being performed by the television to detect a series of non-continuous time-spread pings, each ping comprising an identifying portion and a code portion;
   continuing operation of the television to display television programming in accordance with user commands in response to detecting the presence of one of the pings in the received signal by a ping detector included in the television, the detecting of the ping including receiving the ping in the received signal, using the identifying portion of the received ping to identify the received ping as an identified ping, comparing the code portion of the identified ping to a stored code, and continuing operation of the television if the identified code portion matches the stored code;
   locking the television against use in response to failing to detect the presence of the identified ping in the received signal, wherein the ping detector locks the television against use when the identified code portion fails to match the stored code, and
   repeating the steps of interrogating and continuing and locking for subsequently remotely transmitted pings.

2. The method of claim 1 wherein the identified ping comprises at least one predetermined frequency.

3. The method of claim 2 wherein the predetermined frequency includes a frequency that identifies a facility to which the television is associated.

4. The method of claim 1 wherein the locking of the television against use comprises locking the television against use when a predetermined amount of time elapses during which the presence of the identified ping in the received signal is not detected.

5. The method of claim 1 wherein the locking of the television against use comprises locking the television against use upon a predetermined number of consecutive failures to detect the presence of the identified ping in the received signal.

6. The method of claim 1 wherein the locking of the television against use comprises:
   determining when a predetermined amount of time elapses during which the presence of the identified ping in the received signal is not detected;
   counting a number of consecutive times that the predetermined amount of time elapses during which the presence of the identified ping in the received signal is not detected; and,
   locking the television against use when the counted number reaches a predetermined number.

7. The method of claim 1 wherein the code portion includes a code identifying a facility to which the television is associated.

8. The method of claim 1 wherein the locking of the television against use comprises displaying a lack of authorization message.

9. A television, comprising:
   a tuner that tunes to a tuned channel;
   a video processor that processes video of the tuned channel;
   an audio processor that processes audio of the tuned channel; and
   a ping detector that detects a series of non-continuous time-spread pings in a received signal, each ping comprising an identifying portion and a code portion transmitted from a remotely located head end,
   the television remaining in an operating mode to display television programming in response to the ping detector detecting a presence of one of the pings in the received signal, the detecting of the ping including receiving the ping in the received signal, using the identifying portion of the received ping to identify the received ping as an identified ping, comparing the code portion of the identified ping to a stored code, and continuing operation of the television if the code portion of the identified ping matches the stored code, and
   the television assuming a locked mode against use in response to the ping detector failing to detect the presence of the identified ping in the received signal, wherein the ping detector locks the television against use when the code portion fails to match the stored code.

10. The television of claim 9 wherein the ping detector comprises a television controller.

11. The television of claim 9 wherein the identified ping comprises at least one predetermined frequency.

12. The television of claim 11 wherein the predetermined frequency includes a frequency that identifies a facility to which the television is associated.

13. The television of claim 9 wherein the ping detector locks the television against use when a predetermined amount of time elapses during which the presence of the identified ping in the received signal is not detected.

14. The television of claim 9 wherein the ping detector locks the television against use upon a predetermined number of consecutive failures to detect the presence of the identified ping in the received signal.

15. The television of claim 9 wherein the ping detector determines when a predetermined amount of time elapses during which the presence of the identified ping in the received signal is not detected, counts a number of consecutive times that the predetermined amount of time elapses during which the presence of the identified ping in the received signal is not detected, and locks the television against use when the counted number reaches a predetermined number.

16. The television of claim 9 wherein the code portion includes a code identifying a facility to which the television is associated.

17. The television of claim 9 wherein the ping detector locks the television against use and displays a lack of authorization message.

\* \* \* \* \*